(12) United States Patent
Ootsu et al.

(10) Patent No.: US 8,558,905 B2
(45) Date of Patent: Oct. 15, 2013

(54) TRANSMISSION DEVICE AND CAMERA DEVICE OPERATING WITH SERIAL SIGNALS CORRESPONDING TO CLOCK SIGNALS HAVING DIFFERENT FREQUENCIES

(75) Inventors: Kinichi Ootsu, Kanagawa (JP); Yasunobu Kojima, Kanagawa (JP)

(73) Assignee: Sony Corporation, Tokyo (JP)

( * ) Notice: Subject to any disclaimer, the term of this patent is extended or adjusted under 35 U.S.C. 154(b) by 277 days.

(21) Appl. No.: 13/079,422

(22) Filed: Apr. 4, 2011

(65) Prior Publication Data

US 2011/0249129 A1 Oct. 13, 2011

(30) Foreign Application Priority Data

Apr. 9, 2010 (JP) ................ P2010-090765

(51) Int. Cl.
*H04N 5/232* (2006.01)
(52) U.S. Cl.
USPC .................................. 348/211.14; 348/211.1
(58) Field of Classification Search
None
See application file for complete search history.

(56) References Cited

U.S. PATENT DOCUMENTS

| 6,236,697 B1 * | 5/2001 | Fang ............................ 375/376 |
| 2004/0227855 A1 * | 11/2004 | Morel et al. .................. 348/512 |
| 2004/0258188 A1 * | 12/2004 | Kim et al. ..................... 375/376 |
| 2006/0165204 A1 * | 7/2006 | Shumarayev et al. ........ 375/371 |
| 2008/0111715 A1 * | 5/2008 | Ohara ............................ 341/50 |
| 2008/0232806 A1 * | 9/2008 | Sakata et al. .................. 398/79 |

FOREIGN PATENT DOCUMENTS

| JP | 2006 303582 | 11/2006 |
| JP | 2006303582 A | * 11/2006 |

* cited by examiner

*Primary Examiner* — Nelson D. Hernández Hernández
*Assistant Examiner* — Dennis Hogue
(74) *Attorney, Agent, or Firm* — Frommer Lawrence & Haug LLP; William S. Frommer

(57) ABSTRACT

A transmission device includes: a transceiving unit transceiving a serial signal generated by serially converting data based on a clock signal of a frequency selected from frequencies used as clock components of the serial signal and including the clock signal of the selected frequency; a clock recovering unit receiving the serial signal received by the transceiving unit and recovers a recovered clock signal from the serial signal; a match determination unit receiving the recovered clock signal and determines whether a frequency of the recovered clock signal matches each of the frequencies; and a frequency controller performing, if the match determination unit determines that the frequency of the recovered clock signal matches each of the frequencies, a control to determine the frequency of the recovered clock signal as the matching frequency, wherein the frequency of the recovered clock signal is switched between the frequencies until the frequency is determined by the frequency controller.

12 Claims, 9 Drawing Sheets

FIG.9
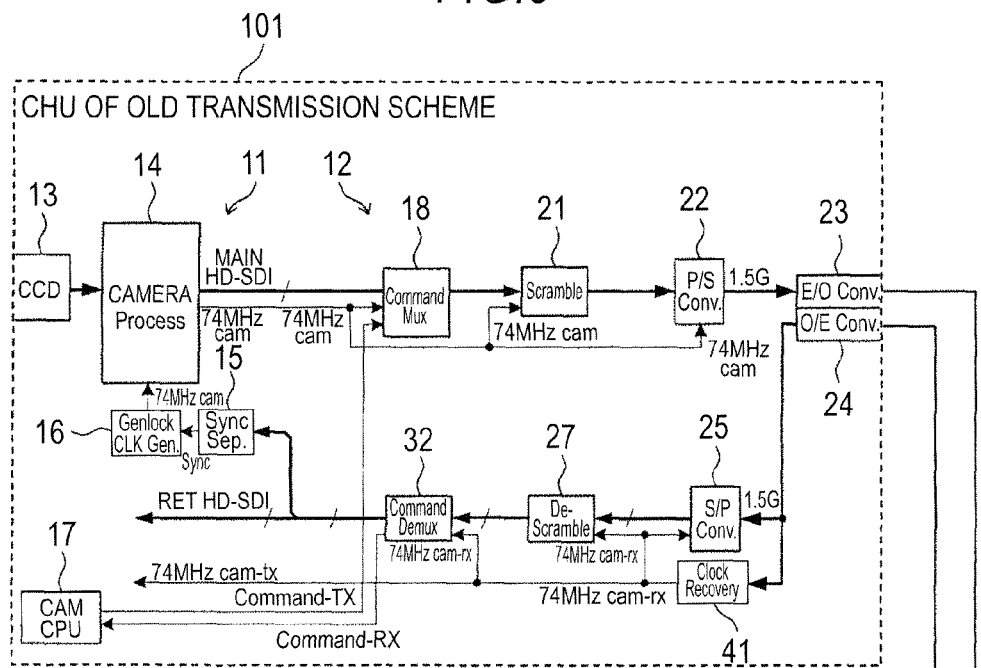
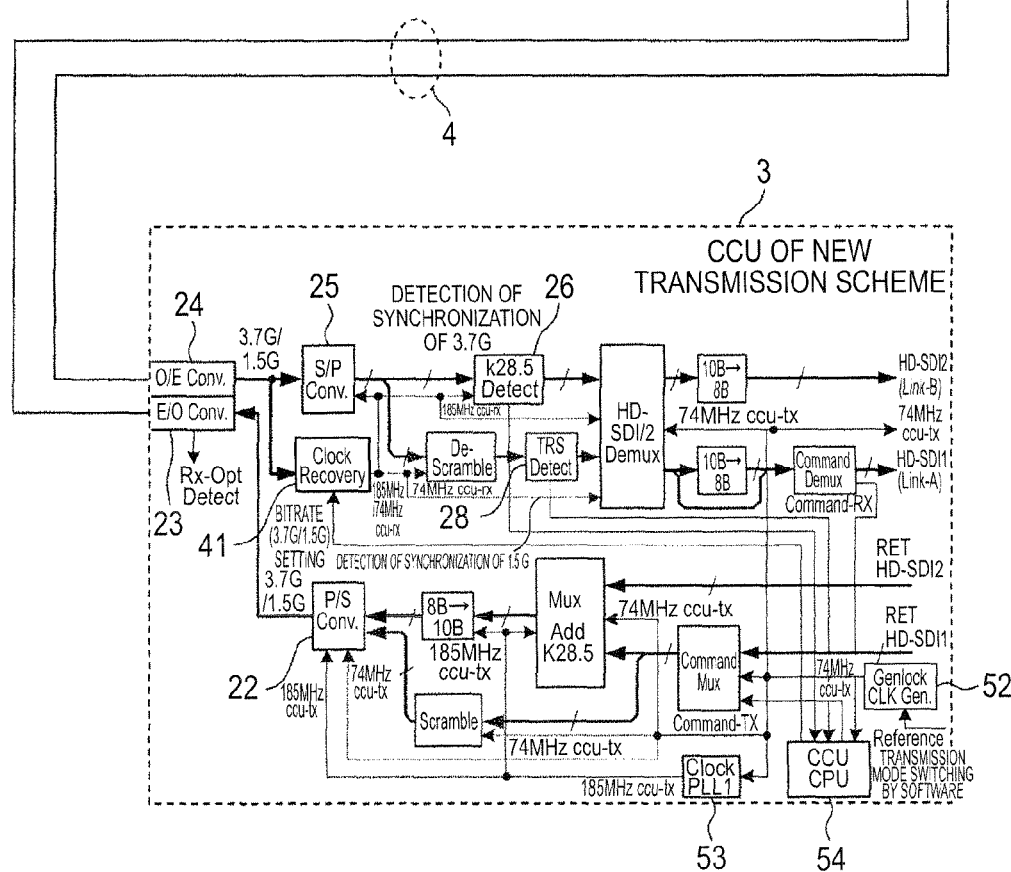

TRANSMISSION DEVICE AND CAMERA DEVICE OPERATING WITH SERIAL SIGNALS CORRESPONDING TO CLOCK SIGNALS HAVING DIFFERENT FREQUENCIES

BACKGROUND OF THE INVENTION

1. Field of the Invention

The present invention relates to a transmission device which transmits a serial signal including a clock signal, a camera device, a camera controller and a camera system.

2. Description of the Related Art

A camera system including a camera head unit (CHU) and a camera control unit (CCU) is used to pick up images used for television broadcastings and so on.

The CCU transmits a GENLOCK signal or the like to the CHU.

The CHU outputs an image signal obtained by image pickup to the CCU in synchronization with this GENLOCK signal.

A GENLOCK signal refers to a signal which synchronizes timings of generation or transmission of image signals by a plurality of CHUs, for example.

According to such synchronization, a plurality of image signals input from a plurality of CCUs to a switcher and so on synchronizes with each other.

Since the image signals picked-up by the plurality of CHUs are input in synchronization, the switcher may changes an image source while synchronizing frames before and after an image is switched over.

This allows the frames before and after the switching-over of image to be continuous in an output image signal.

For a camera system, the CHU and the CCU are connected by one optical fiber cable or the like (see JP-A-2006-303582).

In this case, the CHU and the CCU transceive an image signal, a GENLOCK signal and so on by means of two-way communication using one optical fiber cable.

For this reason, the CHU and the CCU use their respective clock signals having the common predetermined frequency to convert image data and/or GENLOCK data into a serial signal and transceive this serial signal by means of two-way communication.

SUMMARY OF THE INVENTION

In recent years, television broadcastings and so on need high quality images and so on.

However, since existing camera systems convert data serially based on clock signals having the common predetermined frequency which is able to bear use at initial installation of the systems, they may not secure transmission capacity for high quality images.

Accordingly, for such existing camera systems, there is a need of replacement with the CHU and the CCU using a transmission device corresponding to a clock signal having a higher frequency.

However, when a frequency of a clock signal for serial transmission of the CHU and the CCU is increased so, the CHU and the CCU have no compatibility with existing ones.

As a result, the CHU and the CCU may not be replaced step by step but need to be collectively replaced.

In addition, for example, even a new CHU with increased frequency of a clock signal for serial transmission may not be temporarily used in combination with the existing CCUs.

So, for a camera system, it is desirable to provide a transmission device such as a CHU or a CCU to transceive serial signals corresponding to clock signals having different frequencies.

According to an embodiment of the present invention, there is provided a transmission device including: a transceiving unit which transceives a serial signal which is generated by serially converting data based on a clock signal of a frequency selected from a plurality of frequencies used as clock components of the serial signal and includes the clock signal of the selected frequency; a clock recovering unit which receives the serial signal received by the transceiving unit and recovers a recovered clock signal from the serial signal; a match determination unit which receives the recovered clock signal recovered by the clock recovering unit and determines whether or not a frequency of the recovered clock signal matches each of the plurality of frequencies; and a frequency controller which, if the match determination unit determines that the frequency of the recovered clock signal matches each of the plurality of frequencies, performs a control to determine the frequency of the recovered clock signal recovered in the clock recovering unit as the matching frequency. The frequency of the recovered clock signal recovered in the clock recovering unit is switched between the plurality of frequencies until the frequency is determined by the frequency controller.

In the transmission device of this embodiment, the frequency of the recovered clock signal recovered in the clock recovering unit is switched between the plurality of frequencies until the frequency is determined by the frequency controller.

The match determination unit determines whether or not a frequency of the clock signal included in the received serial signal matches each of the plurality of frequencies to which the transmission device corresponds.

If there is one matching frequency, the frequency controller performs a control to determine the frequency of the recovered clock signal recovered in the clock recovering unit as the matching frequency.

Accordingly, based on the frequency of the clock signal included in the serial signal, the frequency of the recovered clock signal is able to be switched to receive the serial signal.

According to another embodiment of the present invention, there is provided a camera device including: an image pickup section which generates a picked-up image signal; and a communication section which transmits a serial signal which is generated by serially converting the image signal based on a clock signal of a frequency selected from a plurality of frequencies used as clock components of the serial signal and includes the clock signal of the selected frequency. The communication section includes: a transceiving unit which transceives the serial signal; a clock recovering unit which receives the serial signal received by the transceiving unit and recovers a recovered clock signal from the serial signal; a match determination unit which receives the recovered clock signal recovered by the clock recovering unit and determines whether or not a frequency of the recovered clock signal matches each of the plurality of frequencies; and a frequency controller which, if the match determination unit determines that the frequency of the recovered clock signal matches each of the plurality of frequencies, performs a control to determine the frequency of the recovered clock signal recovered in the clock recovering unit as the matching frequency. The frequency of the recovered clock signal recovered in the clock recovering unit is switched between the plurality of frequencies until the frequency is determined by the frequency controller.

According to still another embodiment of the present invention, there is provided a camera controller including: a transceiving unit which is connected to a camera device and transceives a serial signal including a clock signal of a frequency selected from a plurality of frequencies used as clock components of the serial signal between the transceiving unit and the camera device; a clock recovering unit which receives the serial signal received by the transceiving unit and recovers a recovered clock signal from the serial signal; a match determination unit which receives the recovered clock signal recovered by the clock recovering unit and determines whether or not a frequency of the recovered clock signal matches each of the plurality of frequencies; and a frequency controller which, if the match determination unit determines that the frequency of the recovered clock signal matches each of the plurality of frequencies, performs a control to determine the frequency of the recovered clock signal recovered in the clock recovering unit as the matching frequency. The frequency of the recovered clock signal recovered in the clock recovering unit is switched between the plurality of frequencies until the frequency is determined by the frequency controller.

According to yet another embodiment of the present invention, there is provided a camera system including: a camera device which transmits a serial signal of a picked-up image; and a camera controller which is connected to the camera device, transmits a serial signal including a clock signal of a frequency selected from a plurality of frequencies used as clock components of the serial signal, and receives a serial signal of an image serially converted by the transmitted clock signal of the selected frequency from the camera device. At least one of the camera device and the camera controller includes: a first transceiving unit which transceives the serial signal; a first clock recovering unit which receives the serial signal received by the first transceiving unit and recovers a first recovered clock signal from the serial signal; a first match determination unit which receives the first recovered clock signal recovered by the first clock recovering unit and determines whether or not a frequency of the first recovered clock signal matches each of the plurality of frequencies; and a first frequency controller which, if the first match determination unit determines that the frequency of the first recovered clock signal matches each of the plurality of frequencies, performs a control to determine the frequency of the first recovered clock signal recovered in the first clock recovering unit as the matching frequency. The frequency of the first recovered clock signal recovered in the first clock recovering unit is switched between the plurality of frequencies until the frequency is determined by the first frequency controller.

According to the embodiments, the transmission device such as the CHU, the CCU and the like in the camera system is able to transceive serial signals corresponding to clock signals having different frequencies.

BRIEF DESCRIPTION OF THE DRAWINGS

FIG. 9 is an explanatory view for explaining a case where the CHU in FIG. 3 corresponding to an old transmission scheme and the CCU in FIG. 5 corresponding to a new transmission scheme, are connected to an optical fiber cable.

DESCRIPTION OF THE PREFERRED EMBODIMENTS

Hereinafter, embodiments of the present invention will be described with reference to the drawings.
Description will be given in the following order.
1. Camera system
2. CHU
3. Transmission mode automatic detection circuit of CHU
4. Transmission mode automatic detection operation of CHU
5. CCU
6. Transmission mode automatic detection circuit of the CCU
7. Transmission mode automatic detection operation of the CCU
8. Connection in new transmission scheme
9. Connection in old transmission scheme

[1. Camera System 1]

Figure 1:
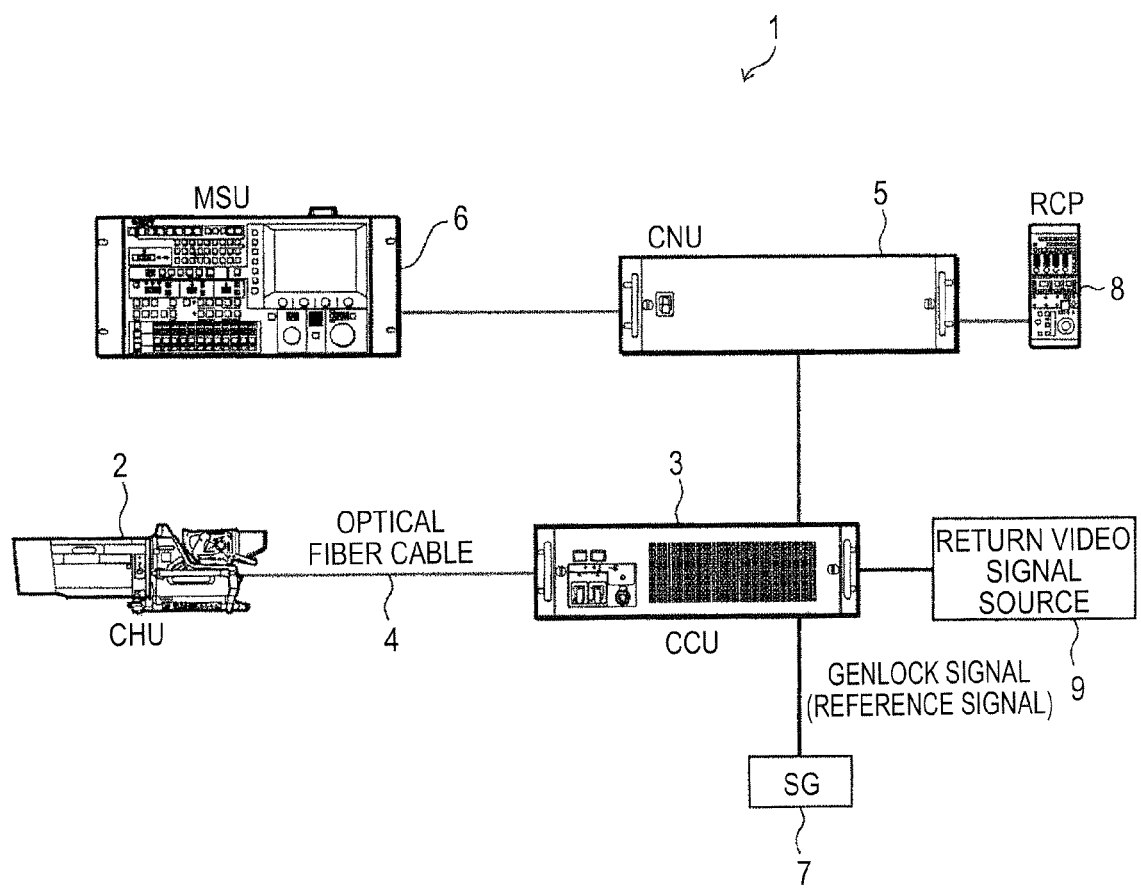
FIG. 1 is a view showing a configuration of a camera system according to an embodiment of the present invention.

FIG. 1 is a view showing a configuration of a camera system 1 according to an embodiment of the present invention.
The camera system 1 of FIG. 1 is used for a broadcasting station and so on.
To this end, the camera system 1 includes a camera head unit (CHU) 2 and a camera control unit (CCU) 3.
The camera system 1 further includes a camera command network unit (CNU) 5, a master setup unit (MSU) 6, a signal generator (SG) 7, a remote control panel (RCP) 8 and a return video signal source 9.
The CHU 2 and the CCU 3 are connected in a one-to-one correspondence by an optical fiber cable 4.
The CNU 5 is connected to the CCU 3. The MSU 6 and the RCP 8 are connected to the CNU 5.
The SG 7 and the return video signal source 9 are connected to the CCU 3.
The CHU 2 and the CCU 3 of FIG. 1 correspond to optical serial signals including clock signals of different frequencies, i.e., having different bit rates.
That is, the CHU 2 and the CCU 3 transceive an optical serial signal having a high bit rate or an optical serial signal having a low bit rate depending on a counterpart apparatus connected by the optical fiber cable 4.
The optical serial signal having a low bit rate is a signal according to an existing transmission scheme of the CHU 2 and the CCU 3 and includes a clock signal component of, for example, 74 MHz.
The optical serial signal including the 74 MHz clock signal may achieve a data transmission speed of about 1.5 Gbps.
The data transmission speed of 1.5 Gbps allows transceive of a video signal, an audio signal and a control signal, each having an amount of HD-SDI (High Definition Serial Digital Interface)×1ch.

The optical serial signal having a high bit rate is a signal according to a transmission scheme newly provided for high quality image and includes a clock signal component of, for example, 185 MHz.

The optical serial signal including the 185 MHz clock signal may achieve a data transmission speed of about 3.7 Gbps.

The data transmission speed of 3.7 Gbps allows round trip transmission of HD-SDI×2ch.

In addition, the optical serial signal having the high bit rate may achieve a data transmission speed of about 3 Gbps with a clock signal frequency of about 148 MHz.

In this manner, the camera system of FIG. 1 may transfer data using the optical serial signal having the high bit rate in addition to the existing optical serial signal having the low bit rate.

Figure 2:
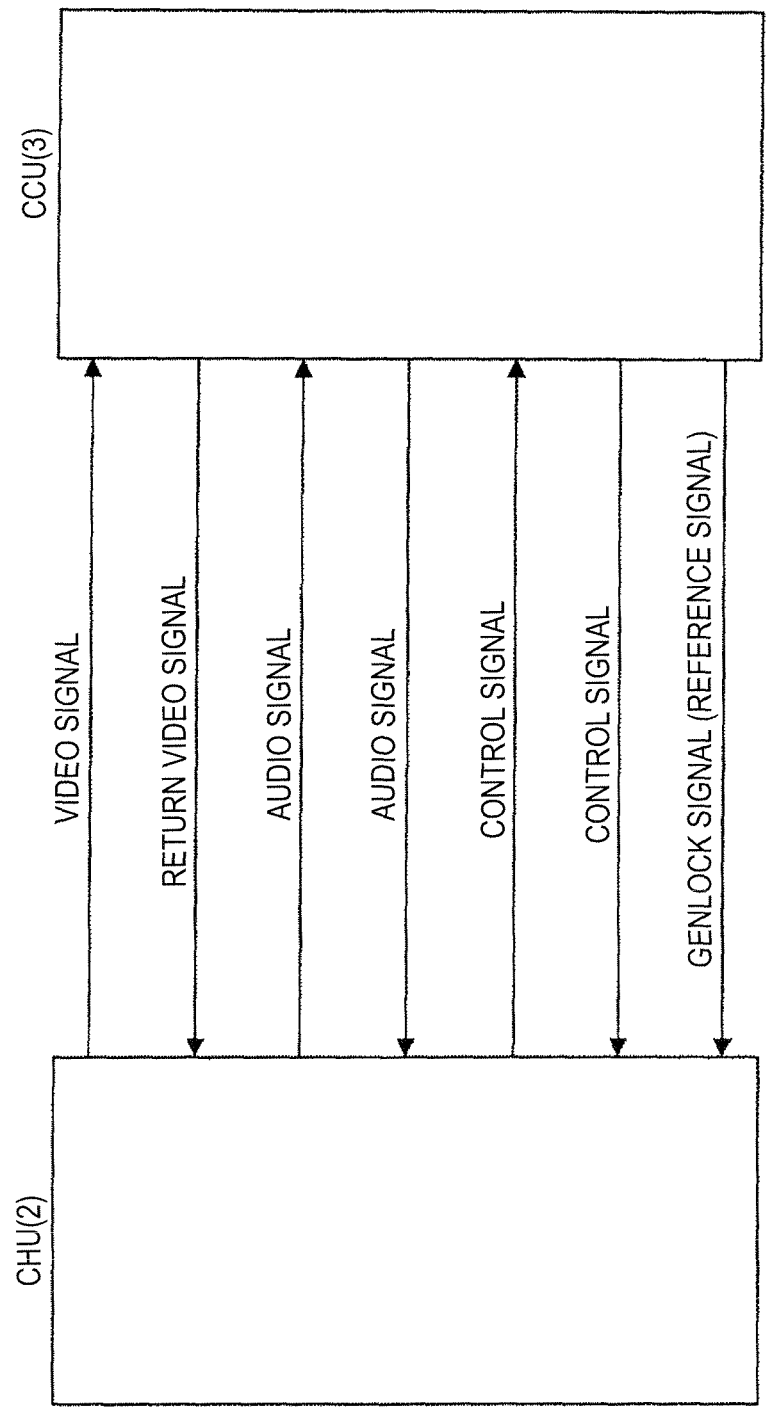
FIG. 2 is an explanatory view of various signals transmitted between the CHU and the CCU in FIG. 1.

FIG. 2 is an explanatory view of various signals transmitted between the CHU 2 and the CCU 3 in FIG. 1.

Various signals shown in FIG. 2 are transceived by means of two-way communication through the optical fiber cable 4 connecting the CHU 2 and the CCU 3.

As shown in FIG. 2, the CHU 2 transmits a video signal, an audio signal and a control signal to the CCU 3.

The video and audio signals transmitted from the CHU 2 to the CCU 3 are output to any device other than the CCU 3.

The control signal transmitted from the CHU 2 to the CCU 3 is transmitted to the CNU 5, the MSU 6 and the RCP 8 via the CCU 3.

The CCU 3 transmits a return video signal, a control signal, an audio signal and a GENLOCK signal (reference signal) to the CHU 2.

The return video signal is generated in a different image source.

The GENLOCK signal is a signal which synchronizes, for example, timings of image pickup by a plurality of CHUs 2, output timings of video signals, etc., and is generated in the SG 7 or the like.

The control signal is generated in the RCP 8, the MSU 6 or the like and is transmitted to the CHU 2 via the CNU 5.

[2. CHU 2]

Figure 3:
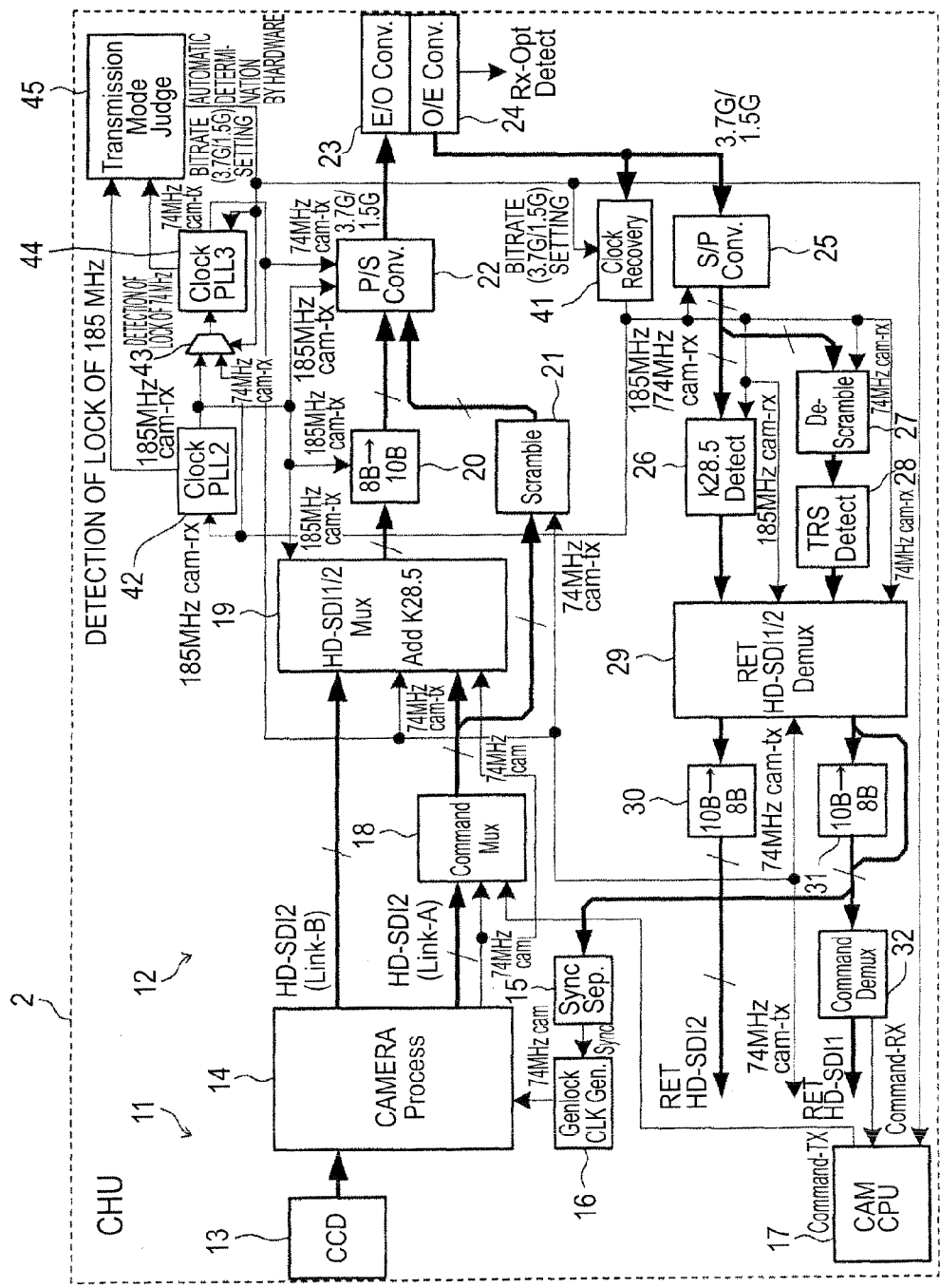
FIG. 3 is a block diagram of the CHU in FIG. 1.

FIG. 3 is a block diagram of the CHU 2 in FIG. 1.

The CHU 2 includes an image pickup section 11 which generates a video signal of a picked-up image, and a CHU communication section 12 which transmits the video signal to the CCU 3 and receives a return video signal from the CCU 3.

The image pickup section 11 includes an image sensor 13, an image processor 14, a synchronization signal generator 15 and an image clock generator 16.

The image sensor 13 converts image light of a subject or the like using a plurality of photoelectric devices to generate image pickup signals including different pixel values.

The synchronization signal generator 15 is connected to a 10B/8B converter 31 or a separation demultiplexer 29 and generates an internal synchronization signal synchronizing with the GENLOCK signal from the return video signal received by the CHU communication section 12.

The image clock generator 16 is connected to the synchronization generator 15. The image clock generator generates an image clock signal having a predetermined frequency synchronizing with the internal synchronization signal. A frequency of the image clock signal is, for example, 74 MHz.

The image processor 14 is connected to the image sensor 13 and the image clock generator 16. The image processor 14 generates video signals from image pickup signals using the image clock signal and outputs the generated video signals in synchronization with the internal synchronization signal.

The image processor 14 outputs main line video signal 1 (Link-A) and main line video signal 2 (Link-B) as video signals of 2ch for high rate video signals.

The image processor 14 outputs a main video signal of 1ch for a low rate video signal.

The video signals generated by the image processor 14 may be signals in compliance with a format of HD-SDI, for example.

The CHU communication section 12 transceiver a high bit rate optical serial signal or a low bit rate optical serial signal in response to the CCU 3 connected by the optical fiber cable 4.

To this end, the CHU communication section 12 includes a central processing unit (CPU) 17, a command multiplexer 18, a combination multiplexer 19, a 8B/10B converter 20, a scrambler 21, a P/S converter 22 and an E/O converter 23.

The command multiplexer 18, the scrambler 21, the P/S converter 22 and the E/O converter 23 are used for transmission of the low bit rate optical serial signal.

The command multiplexer 18 is connected to the image processor 14 of the image pickup section 11 and CPU 17. The command multiplexer 18 multiplexes a command signal output from CPU 17 with the main line video signals.

The scrambler 21 is connected to the command multiplexer 18. The scrambler 21 scrambles the main line video signals multiplexed with the command signal by the command multiplexer 18.

The P/S converter 22 is connected to the scrambler 21 and converts scrambled parallel signals into a serial signal. When the low bit rate optical serial signal is transmitted, the P/S converter 22 uses a 74 MHz clock signal for low bit rate to generate the serial signal.

The E/O converter 23 is connected to the P/S converter 22. The E/O converter 23 is also connected with the optical fiber cable 4. The E/O converter 23 includes a laser diode and drives the laser diode based on the serial signal input from the P/S converter 22. The E/O converter 23 converts the electrical serial signal into an optical serial signal.

Accordingly, the low bit rate optical serial signal is output from the E/O converter 23 to the optical fiber cable 4.

In addition, the command multiplexer 18, the combination multiplexer 19, the 8B/10B converter 20, the P/S converter 22 and the E/O converter 23 are used for transmission of the high bit rate optical serial signal.

The command multiplexer 18 is connected to the image processor 14 of the image pickup section 11 and CPU 17. The command multiplexer 18 multiplexes a command signal output from CPU 17 with the main line video signal 1 (Link-A).

The combination multiplexer 19 is connected to the image processor 14 of the image pickup section 11 and the command multiplexer 18. The combination multiplexer 19 mixes the main line video signal 2 (Link-B) with the main line video signal 1 (Link-A) multiplexed with the command signal by the command multiplexer 18.

In addition, the combination multiplexer 19 adds a predetermined synchronization code to a combined high bit rate combination signal. The synchronization code may be, for example, K28.5.

The 8B/10B converter 20 is connected to the combination multiplexer 19. The 8B/10B converter 20 makes the number of bits of the high bit rate combination signal redundant into 10 bits in the unit of 8 bits.

The P/S converter 22 is connected to the 8B/10B converter 20. The P/S converter 22 converts parallel signals output from the 8B/10B converter 20 into a serial signal. When the high bit rate optical serial signal is transmitted, the P/S converter 22 uses a 185 MHz clock signal for high bit rate to generate the serial signal.

The E/O converter 23 is connected to the P/S converter 22 and the optical fiber cable 4. The E/O converter 23 drives the laser diode based on the serial signal input from the P/S converter 22.

Accordingly, the high bit rate optical serial signal is output from the E/O converter 23 to the optical fiber cable 4.

In addition, the CHU communication section 12 includes an O/E converter 24, an S/P converter 25, a synchronization code detector 26, a descrambler 27, a TRS detector 28, a separation demultiplexer 29, a first 10B/8B converter 31, a second 10B/8B converter 30 and a command demultiplexer 32.

The O/E converter 24, the S/P converter 25, the descrambler 27, the TRS detector 28, the separation demultiplexer 29 and the command demultiplexer 32 are used for receipt of the low bit rate optical serial signal.

The O/E converter 24 is connected to the optical fiber cable 4. The O/E converter 24 includes a photodiode and converts an optical signal input from the optical fiber cable 4 into an electrical signal. The O/E converter 24 converts an optical serial signal into an electrical serial signal.

The S/P converter 25 is connected to the O/E converter 24. The S/P converter 25 converts the serial signal input from the O/E converter 24 into a parallel signal.

The descrambler 27 is connected to the S/P converter 25 and descrambles a low bit rate return video signal.

The TRS detector 28 is connected to the descrambler 27. The TRS detector 28 detects a timing reference signal (TRS) included in the return video signal.

Examples of the timing reference signal (TRS) may include a SAV (Start of Active Video) signal for HD-SDI, etc. An image reproducing apparatus synchronizes a horizontal scanning period, a vertical scanning period and the like of an image at a detection timing of the timing reference signal.

The return video signal is coupled to the separation demultiplexer 29. The separation demultiplexer 29 is internally through-passed and the first 10B/8B converter 31 is bypassed and is connected to the command demultiplexer 32.

The command demultiplexer 32 separates the command signal from the return video signal multiplexed with the command signal. The command signal is output to CPU 17. The return video signal is displayed on a display unit (not shown) of the image pickup section 11.

The O/E converter 24, the S/P converter 25, the synchronization code detector 26, the separation demultiplexer 29, the first 10B/8B converter 31, the second 10B/8B converter 30 and the command demultiplexer 32 are used for receipt of the high bit rate optical serial signal.

The O/E converter 24 is connected to the optical fiber cable 4. The O/E converter 24 includes a photodiode and converts an optical signal input from the optical fiber cable 4 into an electrical signal. The O/E converter 24 converts an optical serial signal into an electrical serial signal.

The S/P converter 25 is connected to the O/E converter 24. The S/P converter 25 converts the serial signal input from the O/E converter 24 into a parallel signal.

The synchronization code detector 26 is connected to the S/P converter 25. The synchronization code detector 26 detects a synchronization signal included in the high bit rate return video signal.

The separation demultiplexer 29 is connected to the synchronization code detector 26. The separation demultiplexer 29 separates a combination signal including the synchronization code detected by the synchronization code detector 26 as ahead into return video signal 1 and return video signal 2.

The first 10B/8B converter 31 is connected to the separation demultiplexer 29. The first 10B/8B converter 31 decodes return video signal 1 from 10 bits to 8 bits.

The command demultiplexer 32 is connected to the first 10B/8B converter 31. The command demultiplexer 32 separates the command signal from return video signal 1 multiplexed with the command signal. The command signal is output to CPU 17. Return video signal 1 is displayed on the display unit (not shown) of the image pickup section 11, for example.

The second 10B/8B converter 30 is connected to the separation demultiplexer 29. The second 10B/8B converter 30 decodes return video signal 2 from 10 bits to 8 bits to reproduce return video signal 2. Return video signal 2 is displayed on the display unit (not shown) of the image pickup section 11, for example.

In this manner, the CHU 2 of FIG. 3 may transmit/receive the video signals and the command signal of round trip 1ch (HD-SDI×1ch) by the combination signal for low bit rate.

In addition, the CHU 2 of FIG. 3 may transmit/receive the video signals and the command signal of round trip 2ch (HD-SDI×2ch) by the combination signal for high bit rate.

[3. Transmission Mode Automatic Detection Circuit of CHU 2]

The CHU 2 of FIG. 3 further includes circuits which automatically detect two high bit rate and low bit rate transmission modes.

Specifically, the CHU 2 includes a clock recovery circuit 41, a high bit rate PLL (Phase Locked Loop) circuit 42, a selector 43, a low bit rate PLL circuit 44 and a CHU determination controller 45.

The clock recovery circuit 41 is connected to the O/E converter 24. The clock recovery circuit 41 recovers a clock signal included in the optical serial signal received by the O/E converter 24. Hereinafter, this clock signal is referred to as a recovered clock signal.

The high bit rate PLL circuit 42 is connected to the clock recovery circuit 41. The high bit rate PLL circuit 42 outputs a lock detection signal in synchronization with the recovered clock signal if the recovered clock signal is a clock signal for use in predetermined high bit rate transmission.

The selector 43 is connected to the clock recovery circuit 41 and the high bit rate PLL circuit 42. The selector 43 selects one of the clock signal and the recovered clock signal which are generated by the high bit rate PLL circuit 42.

The low bit rate PLL circuit 44 is connected to the selector 43. The low bit rate PLL circuit 44 outputs a lock detection signal in synchronization with the clock signal selected by the selector 43 if the selected clock signal is a clock signal for use in predetermined low bit rate transmission.

The CHU determination controller 45 is connected to the clock recovery circuit 41, the high bit rate PLL circuit 42, the selector 43 and the low bit rate PLL circuit 44.

The CHU determination controller 45 outputs a control signal to the selector 43 and the clock recovery circuit 41 and performs a control for change of a frequency set to allow the clock recovery circuit 41 to recover the clock signal and switching between the PLL circuits 42 and 44 used for lock determination.

In addition, upon receiving the lock detection signal from the high bit rate PLL circuit 42 or the low bit rate PLL circuit 44, the CHU determination controller 45 outputs a control signal for maintaining the recovered clock signal generated by the clock recovery circuit 41 at the detected frequency.

This control signal locks the operation of the selector 43 and clock recovery circuit 41.

[4. Transmission Mode Automatic Detection Operation of CHU 2]

Figure 4:
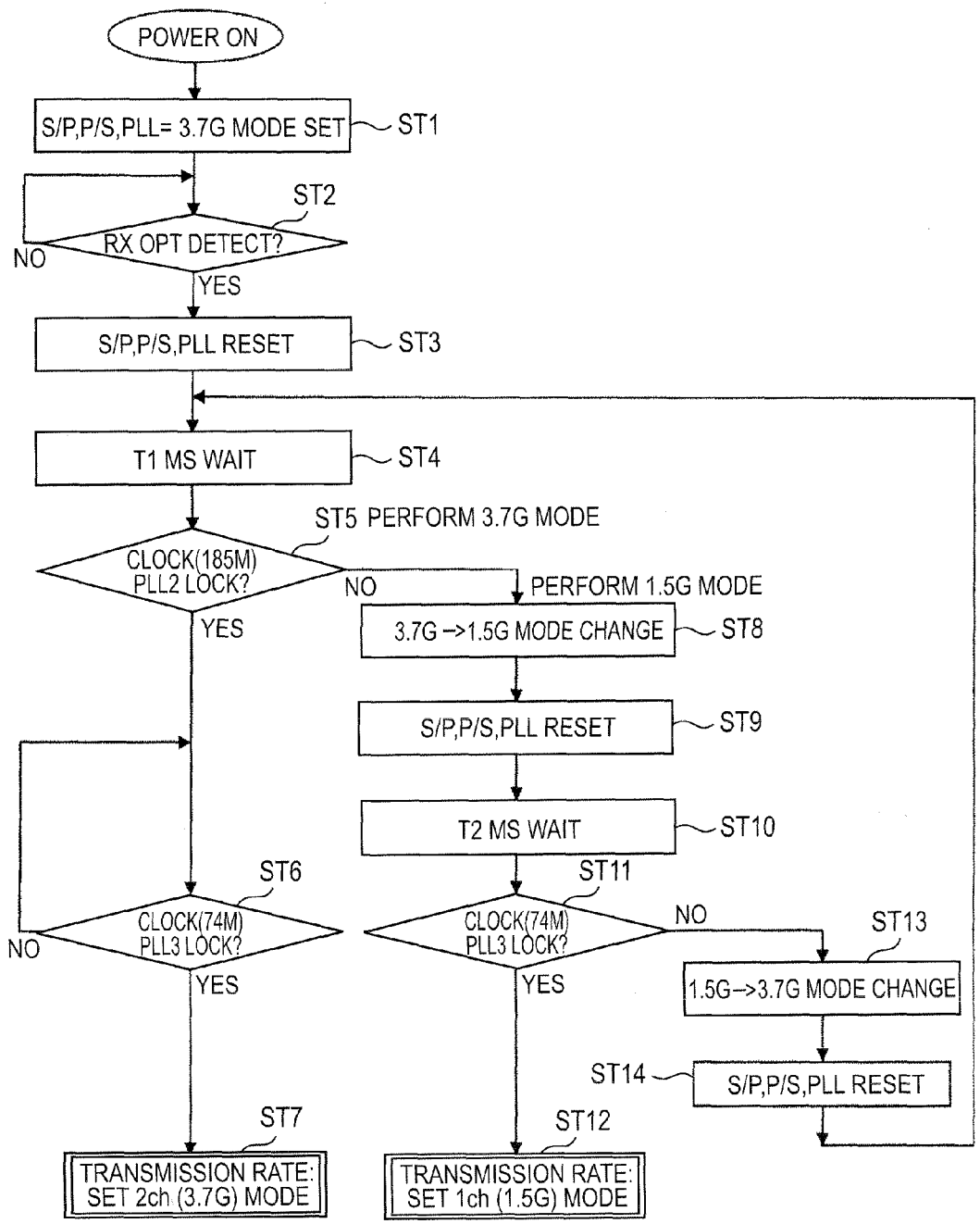
FIG. 4 is a transmission mode automatic detection flow chart of the CHU in FIG. 3.

FIG. 4 is a transmission mode automatic detection flow chart of the CHU 2 in FIG. 3.

The transmission mode automatic detection flow chart of FIG. 4 is executed by hardware of the CHU 2.

When the CHU 2 is started, first, the P/S converter 22, the S/P converter 25, the selector 43 and the clock recovery circuit 41 enter a high bit rate operation mode (Step ST1).

Next, the CHU 2 waits an optical serial signal from the optical fiber cable 4 (Step ST2).

In this state, upon receiving the optical serial signal from the optical fiber cable 4, the CHU determination controller 45 resets the P/S converter 22, the S/P converter 25 an so on to the high bit rate operation mode (Step ST3) and then waits for a predetermined period of time T1$ms$ (Step ST4).

Upon receiving the optical serial signal from the optical fiber cable 4, the clock recovery circuit 41 recovers a high bit rate clock signal. The high bit rate PLL circuit 42 and the low bit rate PLL circuit 44 execute a synchronization operation for the recovered clock signal.

Next, after the period of time T1$ms$ elapses, the CHU determination controller 45 determines whether or not the recovered clock signal synchronizes with a high bit rate clock signal (Step ST5).

The CHU determination controller 45 determines whether or not the recovered clock signal synchronizes with a high bit rate clock signal based on whether or not a lock detection signal of the high bit rate PLL circuit 42 is present.

If the high bit rate PLL circuit 42 outputs the lock detection signal, the CHU determination controller 45 waits until the low bit rate PLL circuit 44 outputs a lock detection signal (Step ST6).

Thereafter, the CHU determination controller 45 executes a control for maintaining the recovered clock signal as the high bit rate clock signal (Step ST7).

The CHU determination controller 45 sets the P/S converter 22, the S/P converter 25, the selector 43 and the clock recovery circuit 41 to the high bit rate operation mode.

On the other hand, if it is determined in Step ST5 that the recovered clock signal does not synchronize with the high bit rate clock signal, the CHU determination controller 45 switches the operation mode from the high bit rate operation mode to a low bit rate operation mode (Step ST8).

Specifically, the CHU determination controller 45 resets the P/S converter 22, the S/P converter 25, the selector 43, the clock recovery circuit 41 and so on to the low bit rate operation mode (Step ST9) and waits for a predetermined period of time T2 ms (Step ST10).

Next, after the period of time T2 ms elapses, the CHU determination controller 45 determines whether or not the recovered clock signal synchronizes with a low bit rate clock signal (Step ST11).

The CHU determination controller 45 makes this determination based on whether or not a lock detection signal of the low bit rate PLL circuit 44 is present.

If the low bit rate PLL circuit 44 outputs the lock detection signal, the CHU determination controller 45 executes a control for maintaining the recovered clock signal as the low bit rate clock signal (Step ST12).

The CHU determination controller 45 sets the P/S converter 22, the S/P converter 25, the selector 43 and the clock recovery circuit 41 to the low bit rate operation mode.

On the other hand, if it is determined in Step ST11 that the recovered clock signal does not synchronize with the low bit rate clock signal, the CHU determination controller 45 switches the operation mode from the low bit rate operation mode to the high bit rate operation mode (Step ST13).

Specifically, the CHU determination controller 45 resets the P/S converter 22, the S/P converter 25, the selector 43, the clock recovery circuit 41 and so on to the high bit rate operation mode (Step ST14).

Thereafter, the CHU determination controller 45 waits for the predetermined period of time T1$ms$ (Step ST4).

In this manner, the CHU determination controller 45 switches the operation mode of the P/S converter 22, the S/P converter 25, the selector 43, the clock recovery circuit 41 and so on between the high bit rate operation mode and the low bit rate operation mode for a predetermined period of time.

Then, when the lock of the clock signal is detected based on the operation of the PLL circuits 42 and 44 in any one of the operation modes, the CHU determination controller 45 performs control to lock the setting of the clock recovery circuit 41 to the frequencies where the lock is detected (step ST7 and ST12).

[5. CCU 3]

Figure 5:
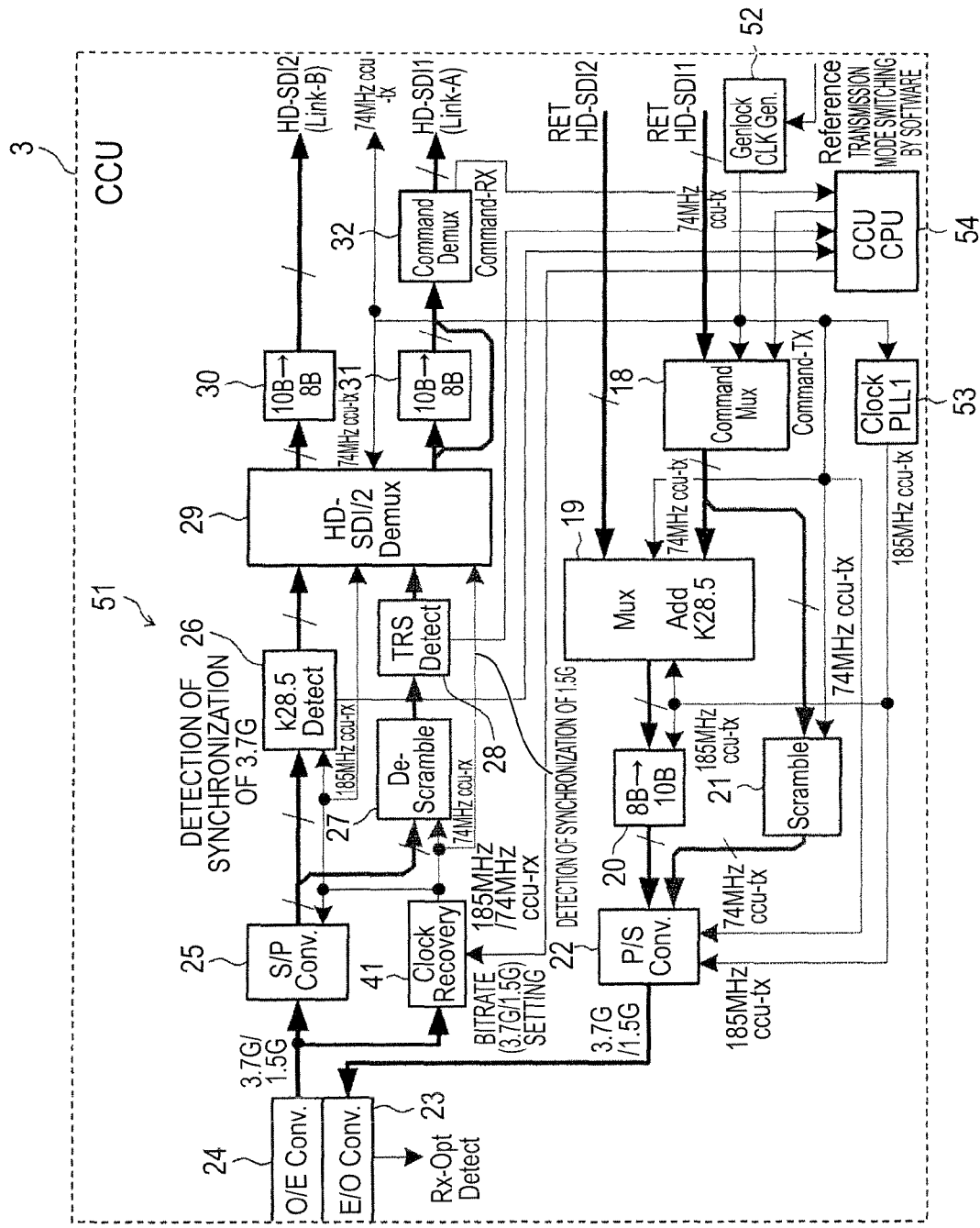
FIG. 5 is a block diagram of the CCU in FIG. 1.

FIG. 5 is a block diagram of the CCU 3 in FIG. 1.

The CCU 3 includes a CCU communication section 51 which transmits a return video signal and so on to the CHU 2 and receives a main line video signal from the CHU 2.

The CCU communication section 51 transceives a high bit rate optical serial signal or a low bit rate optical serial signal in response to the CHU 2 connected by the optical fiber cable 4.

To this end, the CCU communication section 51 includes an image clock generator 52, a high bit rate clock generator 53, a command multiplexer 18, a combination multiplexer 19, a 8B/10B converter 20, a scrambler 21, a P/S converter 22 and an E/O converter 23.

In addition, the CCU communication section 51 includes an O/E converter 24, an S/P converter 25, a synchronization code detector 26, a descrambler 27, a TRS detector 28 and a separation demultiplexer 29.

Moreover, the CCU communication section 51 includes a first 10B/8B converter 31, a second 10B/8B converter 30 and a command demultiplexer 32.

The image clock generator 52 generates a low bit rate clock signal synchronizing with a GENLOCK signal input from the SG 7. A frequency of the low bit rate clock signal is, for example, 74 MHz.

The low bit rate clock signal is provided to the command multiplexer 18, the combination multiplexer 19, the scrambler 21, the P/S converter 22 and the separation demultiplexer 29.

The high bit rate clock generator 53 is connected to the image clock generator 52. The high bit rate generator 53 generates a high bit rate clock signal synchronizing with the low bit rate clock signal. A frequency of the high bit rate clock signal is, for example, 185 MHz.

The high bit rate clock signal is provided to the combination multiplexer 19, the 8B/10B converter 20 and the P/S converter 22.

Other elements of the CCU communication section 51 have the same configurations and functions as the corresponding elements of the CHU communication section 12 and, therefore, they are denoted by the same reference numerals and explanation thereof will not be repeated for the purpose of clarity.

[6. Transmission Mode Automatic Detection Circuit of CCU 3]

The CCU 3 of FIG. 5 further includes circuits which automatically detect two high bit rate and low bit rate transmission modes.

Specifically, the CCU 3 includes a clock recovery circuit 41, a synchronization code detector 26, a TRS detector 28 and a CCU determination controller 54.

The clock recovery circuit 41 is connected to the O/E converter 24. The clock recovery circuit 41 recovers a clock signal included in the optical serial signal received by the O/E converter 24. Hereinafter, this clock signal is referred to as a recovered clock signal.

The synchronization code detector 26 is connected to the S/P converter 25 and the clock recovery circuit 41. The synchronization code detector 26 detects a synchronization code in a signal resulting from a conversion by the S/P converter 25 based on the recovered clock signal.

If a frequency of the clock recovery signal is 185 MHz, the synchronization code detector 26 may detect the synchronization code in the signal resulting from the conversion by the S/P converter 25. On the other hand, if the frequency of the clock recovery signal is 74 MHz, the synchronization code detector 26 may not detect the synchronization code in the signal resulting from the conversion by the S/P converter 25 due to a discrepancy of a recovered clock.

The TRS detector 28 is connected to the S/P converter 25 and the clock recovery circuit 41. The TRS detector 28 detects a timing reference signal TRS in the signal resulting from the conversion by the S/P converter 25 based on the recovered clock signal.

If the frequency of the clock recovery signal is 74 MHz, the TRS detector 28 may detect the timing reference signal in the signal resulting from the conversion by the S/P converter 25. On the other hand, if the frequency of the clock recovery signal is 185 MHz, the TRS detector 28 may not detect the timing reference signal in the signal resulting from the conversion by the S/P converter 25 due to a discrepancy of a recovered clock.

The CCU determination controller 54 has a CPU and is connected to the clock recovery circuit 41, the synchronization code detector 26, the TRS detector 28, the command multiplexer 18 and the command demultiplexer 32.

The CCU determination controller 45 executes a transmission mode automatic detection process by means of the CPU.

In the transmission mode automatic detection process, the CCU determination controller 54 outputs a control signal to the clock recovery circuit 41 and performs a control for switching the recovered clock signal for each predetermined of time.

In addition, upon receiving a lock detection signal from the synchronization code detector 26 or the TRS detector 28, the CCU determination controller 54 outputs a control signal for maintaining the recovered clock signal generated by the clock recovery circuit 41 at the detected frequency.

This control signal locks the operation of the clock recovery circuit 41.

[7. Transmission Mode Automatic Detection Operation of CCU 3]

Figure 6:
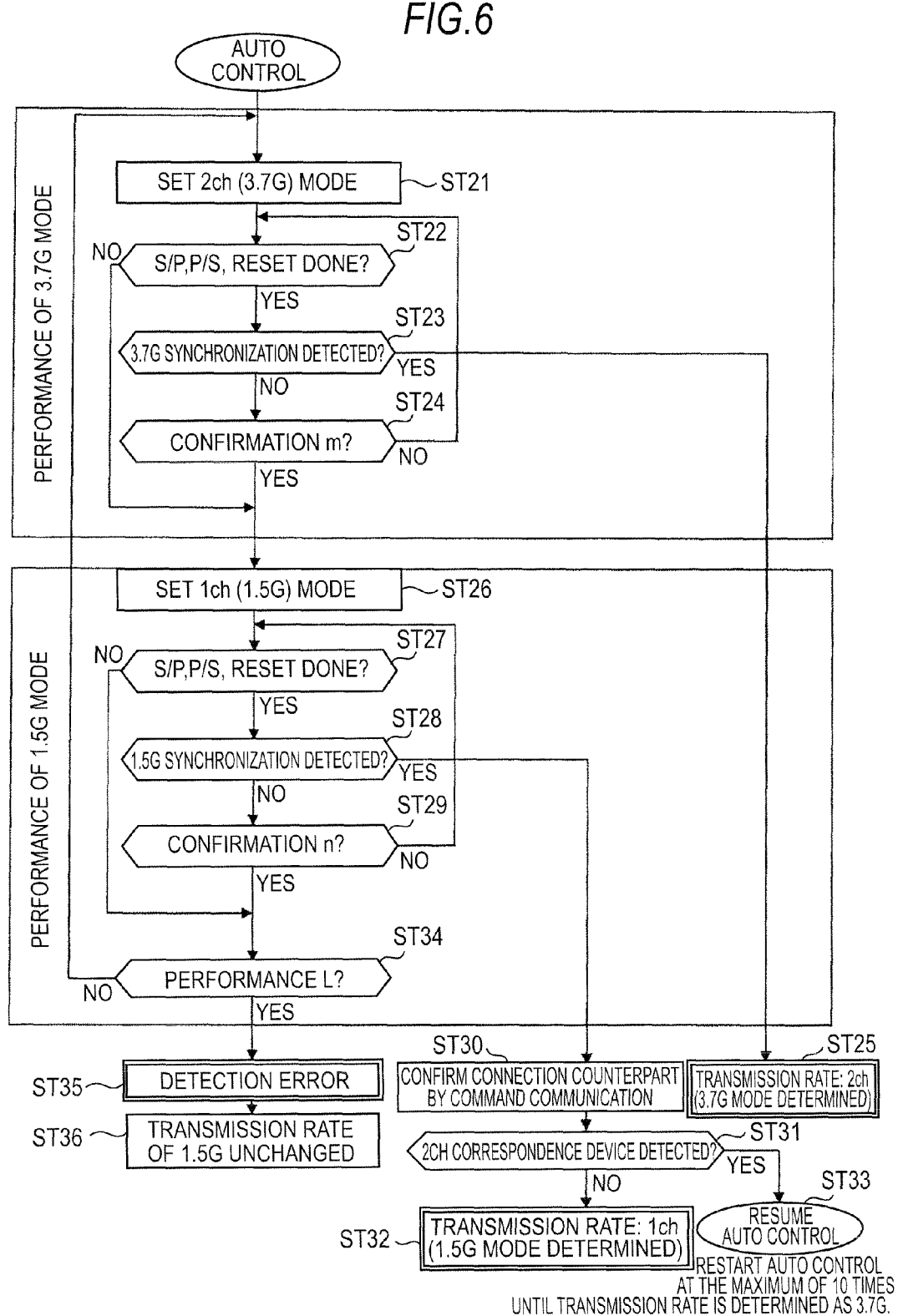
FIG. 6 is a transmission mode automatic detection flow chart of the CCU in FIG. 5.

FIG. 6 is a transmission mode automatic detection flow chart of the CCU 3 in FIG. 5.

The transmission mode automatic detection flow chart of FIG. 6 is executed by hardware and software of the CCU 3.

When the CCU 3 is started, first, a high bit rate operation mode corresponding to a transmission rate of 3.7 Gbps is set (Step ST21).

In the high bit rate operation mode, the P/S converter 22, the S/P converter 25 and the clock recovery circuit 41 are reset to the high bit rate operation mode.

In this state, upon receiving a high bit rate optical serial signal from the optical fiber cable 4, the synchronization code detector 26 detects the synchronization code in the signal resulting from the conversion by the S/P converter 25.

In addition, the TRS detector 28 detects the timing reference signal (TRS) in the signal resulting from the conversion by the S/P converter 25.

The CCU determination controller 54 determines whether or not the P/S converter 22, the S/P converter 25 and the clock recovery circuit 41 are reset to the high bit rate operation mode (Step ST22) and then determines whether or not a recovered clock signal synchronizes with a 3.7 G high bit rate clock signal (Step ST23).

The CCU determination controller 54 makes these determinations based on whether or not the synchronization code is detected by the synchronization code detector 26.

If the synchronization code detector 26 detects the synchronization code, the CCU determination controller 54 determines that the recovered clock signal synchronizes with the 3.7 G high bit rate clock signal.

Then, the CCU determination controller 54 maintains the P/S converter 22, the S/P converter 25 and the clock recovery circuit 41 at the high bit rate operation mode (Step ST25).

If the synchronization code detector 26 does not detect the synchronization code, the CCU determination controller 54 determines the number of times of confirmation of synchronization with the 3.7 G high bit rate clock signal (Step ST24).

If the number of times of confirmation of synchronization does not reach m (m is a natural number), the CCU determination controller 54 repeats the steps from Steps ST22 to ST24.

During this repetition, if the synchronization code detector 26 detects the synchronization code, the CCU determination controller 54 maintains the P/S converter 22, the S/P converter 25 and the clock recovery circuit 41 at the high bit rate operation mode (Step ST25).

On the other hand, if it is determined in Step ST24 that the number of times of confirmation of synchronization reaches m, the CCU determination controller 54 sets a low bit rate operation mode corresponding to a transmission rate of 1.5 Gbps (Step ST26).

In addition, if it is determined in Step ST22 that the P/S converter 22, the S/P converter 25 and the clock recovery circuit 41 are not reset to the high bit rate operation mode, the CCU determination controller 54 sets a low bit rate operation mode corresponding to a transmission rate of 1.5 Gbps (Step ST26).

In the low bit rate operation mode, the P/S converter 22, the S/P converter 25 and the clock recovery circuit 41 are reset to the low bit rate operation mode.

The CCU determination controller 54 determines whether or not the P/S converter 22, the S/P converter 25 and the clock recovery circuit 41 are reset to the low bit rate operation mode (Step ST27) and then determines whether or not a recovered clock signal synchronizes with a 1.5 G low bit rate clock signal (Step ST28).

The CCU determination controller 54 makes these determinations based on whether or not the timing reference signal is detected by the TRS detector 28.

If the TRS detector 28 detects the timing reference signal, the CCU determination controller 54 determines that the recovered clock signal synchronizes with the 1.5 G low bit rate clock signal.

If the TRS detector 28 does not detect the timing reference signal, the CCU determination controller 54 determines the number of times of confirmation of synchronization with the 1.5 G low bit rate clock signal (Step ST34).

If the number of times of confirmation of synchronization does not reach n (n is a natural number), the CCU determination controller 54 repeats the steps from Steps ST27 to ST29.

During this repetition, if the TRS detector 28 detects the timing reference signal, the CCU determination controller 54 determines that the recovered clock signal synchronizes with the 1.5 G low bit rate clock signal.

When it is determined that the recovered clock signal synchronizes with the 1.5 G low bit rate clock signal, the CCU determination controller 54 executes a command transmission confirmation process by software (Step ST30).

The CCU determination controller 54 transmits a command signal to confirm a high bit rate correspondence.

In the command transmission confirmation process, the CCU determination controller 54 outputs the command signal for confirmation to the multiplexer 18.

The multiplexer 18 combines the command signal with a return video signal and so on, the scrambler 21 scrambles a signal resulting from this combination, and the P/S converter 22 converts the scrambled signal into an optical serial signal.

The optical serial signal including the command signal is transmitted from the E/O converter 23 to the O/E converter 24 of the CHU 2.

In the CHU 2, the command signal received in the CHU 2 is recovered by the O/E converter 24, the S/P converter 25, the descrambler 27 and the command demultiplexer 32.

The CPU 17 of the CHU 2 outputs a command signal for response to the recovered command signal to the command multiplexer 18.

The response command signal output to the command multiplexer 18 is transmitted to the CCU 3 via the scrambler 21, the P/S converter 22 and the E/O converter 23.

In the CCU 3, the response command signal received in the CCU 3 is recovered by the O/E converter 24, the S/P converter 25, the descrambler 27 and the command demultiplexer 32.

The command demultiplexer 32 outputs the response command signal received from the CHU 2 to a CPU of the CCU determination controller 54.

After outputting the confirmation command signal to the multiplexer, the CCU determination controller 54 confirms receipt of the response command signal (Step ST31).

Upon receiving the response command signal corresponding to a high bit rate, the CCU determination controller 54 starts again from the beginning of the transmission mode automatic detection flow of FIG. 6 (Step ST33).

On the other hand, if no response command signal is input upon connection of a camera employing an old transmission scheme, the CCU determination controller 54 fixes the transmission mode at the 1.5 G low bit rate operation mode (Step ST32).

The CCU determination controller 54 maintains the P/S converter 22, the S/P converter 25 and the clock recovery circuit 41 at the low bit rate operation mode.

By executing the confirmation process by software in the low bit rate operation, the CCU determination controller 54 does not fix the transmission rate at the low transmission bit rate if the connected the CHU 2 corresponds to the high bit rate transmission.

If it is determined in Step ST29 that the number of times of confirmation of synchronization reaches n, the CCU determination controller 54 determines whether or not the number of times of performance of the transmission mode automatic detection process of FIG. 6 is L (L is a natural number) (Step ST34).

If it is determined in Step ST27 that the P/S converter 22, the S/P converter 25 and the clock recovery circuit 41 are not reset to the low bit rate operation mode, the CCU determination controller 54 determines whether or not the number of times of performance of the transmission mode automatic detection process of FIG. 6 is L (L is a natural number) (Step ST34).

If the number of times of performance of the transmission mode automatic detection process of FIG. 6 does not reach L, the CCU determination controller 54 again starts the transmission mode automatic detection process of FIG. 6 from Step ST21.

On the contrary, if the number of times of performance of the transmission mode automatic detection process of FIG. 6 reaches L, the CCU determination controller 54 determines that there occurs a detection error (Step ST35).

The CCU determination controller 54 maintains the P/S converter 22, the S/P converter 25 and the clock recovery circuit 41 at the low bit rate operation mode (Step ST36).

[8. Connection in New Transmission Scheme]

Figure 7:
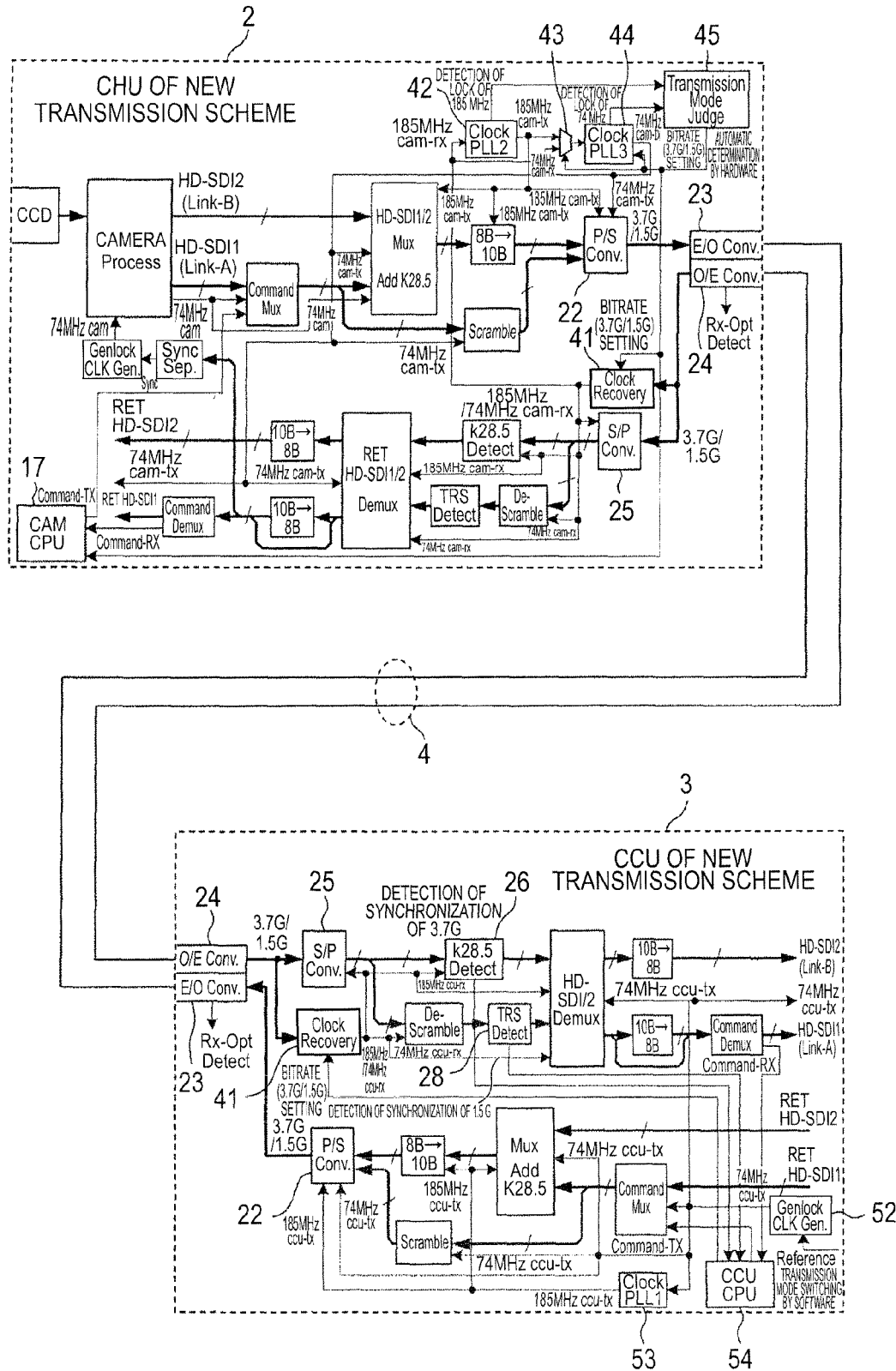
FIG. 7 is an explanatory view for explaining a case where the CHU in FIG. 3 and the CCU in FIG. 5, both of which correspond to a new transmission scheme, are connected to an optical fiber cable.

FIG. 7 is an explanatory view for explaining a case where the CHU 2 in FIG. 3 and the CCU 3 in FIG. 5, both of which correspond to a new transmission scheme, are connected to the optical fiber cable 4.

In a case where the CHU 2 and the CCU 3 corresponding to a new transmission scheme are connected to the optical fiber cable 4, upon being power on, the CHU 2 and CCU 3 start transmission and reception of an optical serial signal into which data are serially converted, based on their respective clock signals.

Then, according to the process of FIG. 6, the CCU determination controller 54 sets the P/S converter 22, the S/P converter 25 and the clock recovery circuit 41 to the high bit rate operation mode.

Accordingly, the CCU 3 transmits the high bit rate optical serial signal to the CHU 2.

Then, according to the process of FIG. 4, the CHU 2 sets the P/S converter 22, the S/P converter 25 and the clock recovery circuit 41 of the CHU 2 to the high bit rate operation mode.

Accordingly, the CHU determination controller 45 and the CCU determination controller 54 typically detect synchronization and maintain their respective operation modes at the high bit rate operation mode.

There may be a case where the CHU 2 may not synchronize with the CCU 3 in the first high bit rate operation mode due to distortion or the like of the GENLOCK signal input to the CCU 3.

In this case, according to the process of FIG. 6, the CCU determination controller 54 switches the P/S converter 22, the S/P converter 25 and the clock recovery circuit 41 of the CCU 3 to the low bit rate operation mode.

In addition, according to the process of FIG. 4, the CHU 2 sets the P/S converter 22, the S/P converter 25 and the clock recovery circuit 41 of the CHU 2 to the low bit rate operation mode.

Accordingly, the CHU determination controller 45 and the CCU determination controller 54 detect synchronization in the low bit rate operation mode.

In this case, without maintaining the operation mode immediately, the CCU determination controller 54 executes a confirmation process by software based on the high bit rate correspondence confirmation command signal.

FIG. 7 shows that both of the CHU 2 and the CCU 3 correspond to the new transmission scheme.

Accordingly, the high bit rate correspondence confirmation command signal transmitted by the CCU determination controller 54 is received by the CHU 2 which then responds the CCU 3 with a response command signal.

As a result, the CCU determination controller 54 starts again from the beginning of the transmission mode automatic detection flow of FIG. 6.

Then, the CHU 2 and the CCU 3 may synchronize with each other in the second and subsequent high bit rate operation modes.

As described above, when the CHU 2 and the CCU 3 corresponding to the new transmission scheme are connected to the optical fiber cable 4, the CHU 2 and the CCU 3 are fixed at a state where they can conduct two-way communication in the high bit rate operation mode.

[9. Connection in Old Transmission Scheme]

Figure 8:
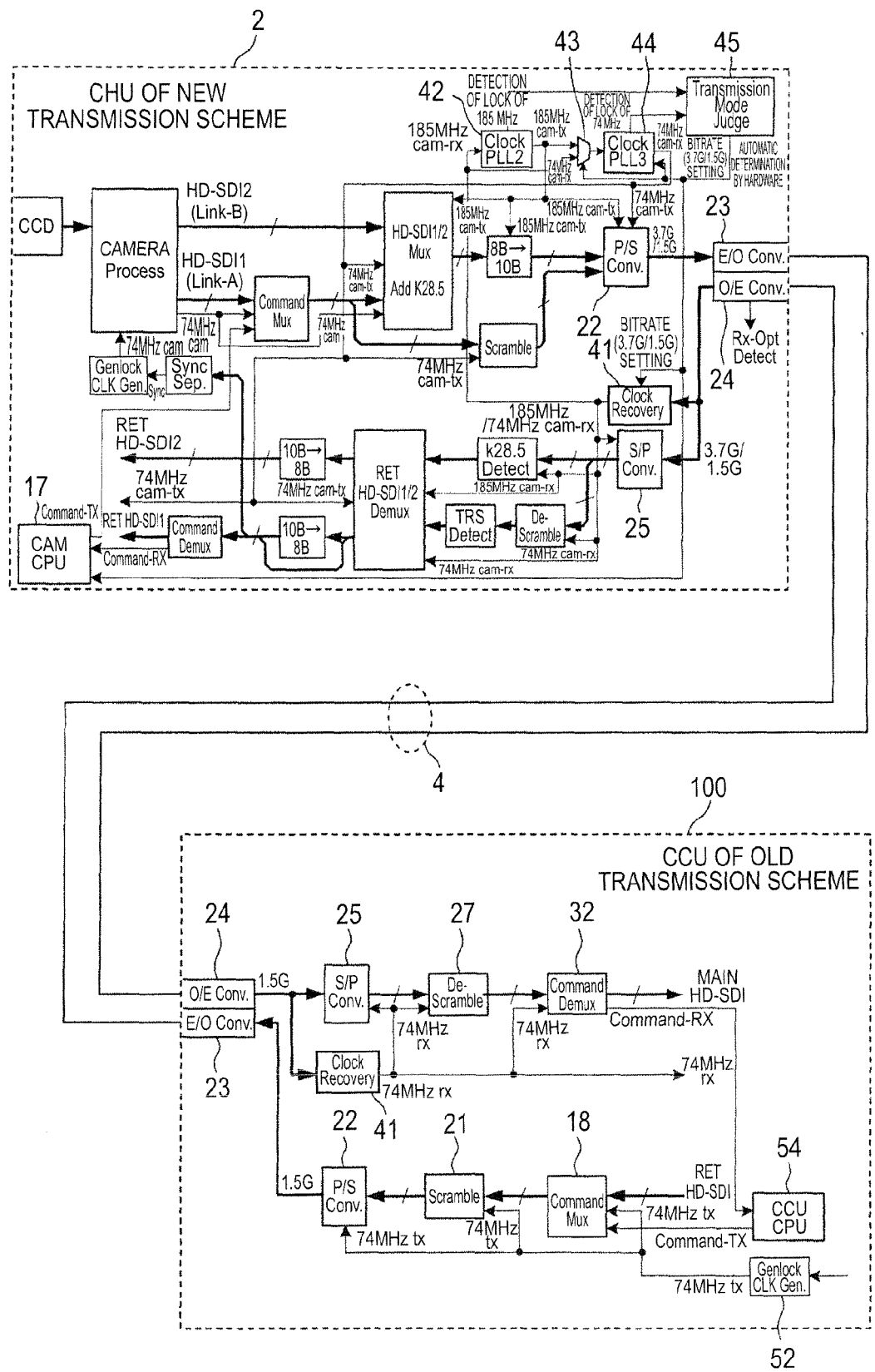
FIG. 8 is an explanatory view for explaining a case where the CHU in FIG. 3 corresponding to a new transmission scheme and the CCU corresponding to an old transmission scheme are connected to an optical fiber cable.

FIG. 8 is an explanatory view for explaining a case where the CHU 2 in FIG. 3 corresponding to a new transmission scheme and a CCU 100 in FIG. 8 corresponding to an old transmission scheme are connected to the optical fiber cable 4.

The CCU 100 of FIG. 8 is a device which uses only a low bit rate transmission scheme to conduct serial data communication.

Various elements of the CCU 100 of FIG. 8 have the same configurations and functions as the corresponding elements of FIG. 3 and, therefore, they are denoted by the same reference numerals and explanation thereof will not be repeated for the purpose of clarity.

When the CCU 100 corresponding to only the low bit rate transmission scheme is connected to the CHU 2 of FIG. 3, the CHU 2 sets the P/S converter 22, the S/P converter 25 and the clock recovery circuit 41 of the CHU 2 to the high bit rate operation mode according to the process of FIG. 4.

However, the CCU 100 transmits only a low bit rate optical serial signal.

Accordingly, the CHU determination controller 45 may determine that there is no synchronization.

In this case, the CHU 2 switches the P/S converter 22, the S/P converter 25 and the clock recovery circuit 41 of the CHU 2 to the low bit rate operation mode.

Then, the CHU determination controller 45 detects synchronization in the low bit rate operation mode and maintains the operation at the low bit rate operation mode.

FIG. 9 is an explanatory view for explaining a case where the CHU 101 corresponding to an old transmission scheme and the CCU 3 in FIG. 5 corresponding to a new transmission scheme are connected to the optical fiber cable 4.

The CHU 101 of FIG. 9 is a device which uses only a low bit rate transmission scheme to conduct serial data communication.

Various elements of the CHU 101 of FIG. 9 have the same configurations and functions as the corresponding elements of FIG. 5 and, therefore, they are denoted by the same reference numerals and explanation thereof will not be repeated for the purpose of clarity.

When the CHU 101 corresponding to only the low bit rate transmission scheme is connected to the CCU 3 of FIG. 5, the CCU 3 sets the P/S converter 22, the S/P converter 25 and the clock recovery circuit 41 of the CCU 3 to the high bit rate operation mode according to the process of FIG. 6.

However, the CHU 101 transmits only a low bit rate optical serial signal.

Accordingly, the CCU determination controller 54 may determine that there is no synchronization.

In this case, the CCU determination controller 54 switches the P/S converter 22, the S/P converter 25 and the clock recovery circuit 41 of the CCU 3 to the low bit rate operation mode.

Then, the CCU determination controller 54 detects synchronization in the low bit rate operation mode.

In addition, after detecting the synchronization in the low bit rate operation mode, without maintaining the operation mode immediately, the CCU determination controller 54 executes a confirmation process by software based on a high bit rate correspondence confirmation command signal.

However, the CHU 101 of the old transmission scheme of FIG. 9 does not correspond to the high bit rate correspondence confirmation command signal.

Accordingly, the CHU 101 of the old transmission scheme of FIG. 9 is unable to transmit a command signal for response to a received command signal to the CCU 3.

As a result, the CCU determination controller 54 fixes the operation mode to the low bit rate operation mode.

As described above, in this embodiment, the high speed optical transmission scheme extending transmission capacity between the CHU 2 and the CCU 3 and the old optical transmission scheme are automatically detected for each of the CHU 2 and the CCU 3.

Accordingly, in this embodiment, even if the old the CHU 101 or the CCU 100 corresponding to only the existing optical transmission scheme is connected to the optical fiber cable 4, it is possible to detect a transmission scheme adapted for the counterpart and transmit video signals and so on.

In addition, for example in the camera system 1 using the 1.5 Gbps existing transmission scheme of HD-SDI×1ch, the CHU 101 or the CCU 100 may be replaced with one corresponding to a new transmission scheme. Lower level compatibility may be secured for new the CHU 2 or the CCU 3.

In particularly, in this embodiment, the CHU 2 performs detection and fixation of a transmission scheme by only hardware and the CCU 3 performs a confirmation process by software.

Accordingly, this embodiment prevents the CHU 2 and the CCU 3 corresponding to the new transmission scheme from being erroneously connected at a low transmission speed of the old transmission scheme.

For example, the CHU 2 receives an optical serial signal from the CCU 3, changes setting of 2ch transmission and 1ch transmission modes for each predetermined period of time, and determines and sets a transmission mode of a connection counterpart based on a frequency locked to a recovered clock signal recovered from the received serial signal.

In addition, an operation at the transmission side of the CHU 2 is switched according to an operation of its receipt side.

This switching operation by hardware allows the CHU 2 to be connected to the CCU 3 of an old 1ch transmission scheme.

In addition, the CCU 3 first sets a transmission mode for transmission/receipt to, for example, an upper level 2ch transmission mode, transmits an optical serial signal to the CHU 2 in the 2ch transmission mode, and then waits return of the optical serial signal from the CHU 2.

In addition, if the connected CHU 2 corresponds to the 2ch transmission mode, since an optical serial signal of a 2ch transmission format is returned to the CCU 3, a circuit at the receipt side of the CCU 3 is able to detect synchronization and set a transmission mode to the upper level 2ch transmission mode.

On the other hand, if the connected CHU 2 is an old device having only a 1ch transmission mode, since the CCU 3 is unable to synchronize with the CHU 2 and a normal optical serial signal is not returned from the CHU 2, the circuit at the receipt side of the CCU 3 is unable to detect synchronization.

In this case, the CCU 3 changes the transmission mode for transmission/receipt to the old 1ch transmission mode and waits synchronization detection at its receipt side.

In addition, if the synchronization is able to be detected in the old 1ch transmission mode, the transmission mode is set to a lower level 1ch transmission mode after confirmation by software.

Even when the connected CHU 2 corresponds to the upper level transmission mode (2ch), there is a rare possibility that the transmission mode is set to the old transmission mode (1ch).

Accordingly, in this embodiment, if synchronization is once obtained in the 1ch transmission mode, it is inquired if the connection counterpart corresponds to the 2ch transmission mode through predetermined command communication between the CHU 2 and the CCU 3.

If it is confirmed that the connection counterpart corresponds to the 2ch transmission mode through a command response, the transmission mode is again set to the 2ch transmission mode and the transmission mode detection process continues. This command communication is performed by the software process.

In this manner, the CCU 3 performs a detection process integrating the hardware detection process with the software determination process.

If the connected CHU 2 corresponds to the upper level transmission mode, the CCU 3 is able to be reliably connected to the CHU 2 in the upper level transmission mode. If the connected CHU 2 corresponds to the old lower level transmission mode, the CCU 3 is able to be connected to the CHU 2 in the lower level transmission mode.

In addition, in this embodiment, the CHU 2 or the CCU 3 corresponding to the upper level transmission scheme has compatibility with the CHU 2 or the CCU 3 of the old transmission scheme.

Accordingly, the CHU 2 and the CCU 3 are able to be connected with unconsciousness of the old and new of all of connection counterparts.

As a result, temporary reinforcement and extension of the CHU 2 are facilitated or the CHU 2 and the CCU 3 in a studio are able to be updated to an upper level device step by step.

In addition, in this embodiment, since a 3.7 Gbps transmission speed is able to be secured, roundtrip transmission of HD-SDI×2ch is possible.

In addition, this embodiment uses an input/output connector, an optic/electric conversion module, a serial/parallel converter and so on, which are common to old HD-SDI×1ch transmission schemes.

Accordingly, this embodiment is able to switch between 2ch transmission and 1ch transmission in both of transmission and receipt systems.

The above-described embodiment is merely one example of exemplary embodiments of the present invention in a non-limited sense. It should be understood that various modifications may be made without departing from the spirit and scope of the invention.

For example, in the above embodiment, the CHU 2 and the CCU 3 correspond to the high bit rate optical serial signal and the low bit rate optical serial signal.

Alternatively, the CHU 2 and the CCU 3 may correspond to optical serial signals of clock signals having 3 or more different frequencies.

For example, the CHU 2 and the CCU 3 in the above embodiment correspond to the clock signals having two different frequencies, i.e., 74 MHz and 185 MHz.

Alternatively, the CHU 2 and the CCU 3 in the above embodiment may correspond to clock signals having further (74/1.001) MHz and (185/1.001) MHz frequencies in addition to the 74 MHz and 185 MHz frequencies.

In addition, to cope with HD-SDI×3ch, the CHU 2 and the CCU 3 may correspond to 222 MHz.

In addition, although it has been illustrated in the above embodiment that the 8B/10B conversion and the HD-SDI scrambling are used to remove a low band component of serial signals, the way to remove such a low band component is not particularly limited.

In addition, although it has been illustrated in the above embodiment that the CHU 2 and the CCU 3 use K28.5 corresponding to the 8B/10B conversion and TRS corresponding to the HD-SDI scrambling, as synchronization codes, the codes may be the same or different codes.

The present application contains subject matter related to that disclosed in Japanese Priority Patent Application JP 2010-090765 filed in the Japan Patent Office on Apr. 9, 2010, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:
1. A transmission device comprising:
a transceiving unit which transceives a serial signal which is generated by serially converting data based on a clock signal of a frequency selected from a plurality of frequencies used as clock components of the serial signal and includes the clock signal of the selected frequency;
a clock recovering unit which receives the serial signal received by the transceiving unit and recovers a recovered clock signal from the serial signal;
a match determination unit which receives the recovered clock signal recovered by the clock recovering unit and determines whether or not a frequency of the recovered clock signal matches each of the plurality of frequencies;
a frequency controller which, if the match determination unit determines that the frequency of the recovered clock signal matches each of the plurality of frequencies, performs a control to determine the frequency of the recovered clock signal recovered in the clock recovering unit as the matching frequency; and
a converting unit which serially converts data based on the clock signal to transmit the serially converted signal to the transceiving unit,
wherein the frequency of the recovered clock signal recovered in the clock recovering unit is switched between the plurality of frequencies until the frequency is determined by the frequency controller,
wherein the converting unit converts a predetermined command data corresponding to a predetermined one of the plurality of frequencies based on the clock signal of the determined frequency and transmits the converted command data from the transceiving unit, and
if there is a predetermined response to the command data, the frequency of the clock signal used by the converting unit is switched to the predetermined frequency.

2. The transmission device according to claim 1,
wherein the serial signal in which the frequency of the clock signal is switched between the plurality of frequencies is input to the transceiving unit, and
the frequency controller determines the frequency of the recovered clock signal recovered by the clock recovering unit if the match determination unit determines that the frequency of the recovered clock signal matches each of the plurality of frequencies.

3. The transmission device according to claim 2,
wherein the match determination unit includes a plurality of phase synchronizing circuits which receive the recovered clock signal and synchronize phases if the received recovered clock signal corresponds to one of the plurality of frequencies, and
the match determination unit determines that frequencies match if the phases are synchronized in one of the plurality of phase synchronizing circuits.

4. The transmission device according to claim 2, wherein the converting unit serially converts any synchronization code for each of the plurality of frequencies based on the recovered clock signal recovered from the serial signal received by the transceiving unit,
wherein the transceiving unit transmits the synchronization code converted by the converting unit as the serial signal.

5. The transmission device according to claim 1,
wherein the transceiving unit receives a serial signal obtained by serially converting any synchronization code for each of the plurality frequencies,
the match determination unit includes a plurality of code detectors which receive the serial signal received by the transceiving unit and detect if the synchronization code obtained from the serial signal by a sampling process which uses the recovered clock signal matches any synchronization code for each of the plurality of frequencies, and
the match determination unit determines that frequencies match if synchronization codes match in one of the plurality of code detectors.

6. The transmission device according to claim 5,
wherein the frequency controller switches the frequency of the clock signal used by the converting unit for the data conversion between the plurality of frequencies until the match determination unit determines that there is a match, and
if the match determination unit determines that there is a match, the frequency controller determines the frequency of the clock signal used by the converting unit for the data conversion as the matching frequency.

7. A camera device comprising:
an image pickup section which generates a picked-up image signal; and
a communication section which transmits a serial signal which is generated by serially converting the image signal based on a clock signal of a frequency selected from a plurality of frequencies used as clock components of the serial signal and includes the clock signal of the selected frequency,
wherein the communication section includes
a transceiving unit which transceives the serial signal;
a clock recovering unit which receives the serial signal received by the transceiving unit and recovers a recovered clock signal from the serial signal;
a match determination unit which receives the recovered clock signal recovered by the clock recovering unit and determines whether or not a frequency of the recovered clock signal matches each of the plurality of frequencies;
a frequency controller which, if the match determination unit determines that the frequency of the recovered clock signal matches each of the plurality of frequencies, performs a control to determine the frequency of the recovered clock signal recovered in the clock recovering unit as the matching frequency, and
a converting unit which serially converts data based on the clock signal to transmit the serially converted signal to the transceiving unit,
the frequency of the recovered dock signal recovered in the clock recovering unit is switched between the plurality of frequencies until the frequency is determined by the frequency controller,
wherein the converting unit converts a predetermined command data corresponding to a predetermined one of the plurality of frequencies based on the clock signal of the determined frequency and transmits the converted command data from the transceiving unit, and
if there is a predetermined response to the command data, the frequency of the clock signal used by the converting unit is switched to the predetermined frequency.

8. A camera controller comprising:
a transceiving unit which can be connected to a camera device and transceives a serial signal including a clock signal of a frequency selected from a plurality of frequencies used as clock components of the serial signal between the transceiving unit and the camera device;
a clock recovering unit which receives the serial signal received by the transceiving unit and recovers a recovered clock signal from the serial signal;
a match determination unit which receives the recovered clock signal recovered by the clock recovering unit and determines whether or not a frequency of the recovered clock signal matches each of the plurality of frequencies;
a frequency controller which, if the match determination unit determines that the frequency of the recovered clock signal matches each of the plurality of frequencies, performs a control to determine the frequency of the recovered clock signal recovered in the clock recovering unit as the matching frequency; and
a converting unit which serially converts data based on the clock signal to transmit the serially converted signal to the transceiving unit,
wherein the frequency of the recovered clock signal recovered in the clock recovering unit is switched between the plurality of frequencies until the frequency is determined by the frequency controller,
wherein the converting unit converts a predetermined command data corresponding to a predetermined one of the plurality of frequencies based on the clock signal of the determined frequency and transmits the converted command data from the transceiving unit, and
if there is a predetermined response to the command data, the frequency of the clock signal used by the converting unit is switched to the predetermined frequency.

9. A camera system comprising:
a camera device which transmits a serial signal of a picked-up image; and
a camera controller which is connected to the camera device, transmits a serial signal including a clock signal of a frequency selected from a plurality of frequencies used as clock components of the serial signal, and receives a serial signal of an image serially converted by the transmitted clock signal of the selected frequency from the camera device, wherein at least one of the camera device and the camera controller includes a first transceiving unit which transceives the serial signal;

a first clock recovering unit which receives the serial signal received by the first transceiving unit and recovers a first recovered clock signal from the serial signal;

a first match determination unit which receives the first recovered clock signal recovered by the first clock recovering unit and determines whether or not a frequency of the first recovered clock signal matches each of the plurality of frequencies;

a first frequency controller which, if the first match determination unit determines that the frequency of the first recovered clock signal matches each of the plurality of frequencies, performs a control to determine the frequency of the first recovered clock signal recovered in the first clock recovering unit as the matching frequency, and a converting unit which serially converts data based on the clock signal to transmit the serially converted signal to the first transceiving unit, the frequency of the first recovered clock signal recovered in the first clock recovering unit is switched between the plurality of frequencies until the frequency is determined by the first frequency controller wherein the converting unit converts a predetermined command data corresponding to a predetermined one of the plurality of frequencies based on the clock signal of the determined frequency and transmits the converted command data from the first transceiving unit, and if there is a predetermined response to the command data, the frequency of the clock signal used by the converting unit is switched to the predetermined frequency.

10. The camera system according to claim 9, wherein the camera device corresponds to the at least one of the camera device and the camera controller, and the camera controller includes a second transceiving unit which transceives a serial signal including a clock signal of a frequency of the plurality of frequencies; and a second clock recovering unit which receives the serial signal received by the second transceiving unit and recovers a recovered clock signal from the serial signal.

11. The camera system according to claim 9, wherein the camera controller corresponds to the at least one of the camera device and the camera controller, and the camera device includes a second transceiving unit which transceives a serial signal including a clock signal of a frequency of the plurality of frequencies; and a second clock recovering unit which receives the serial signal received by the second transceiving unit and recovers a recovered clock signal from the serial signal.

12. The camera system according to claim 9, wherein the other of the camera device and the camera controller includes a second transceiving unit which transceives the serial signal;

a second clock recovering unit which receives the serial signal received by the second transceiving unit and recovers a second recovered clock signal from the serial signal;

a second match determination unit which receives the second recovered clock signal recovered by the second clock recovering unit and determines whether or not a frequency of the second recovered clock signal matches each of the plurality of frequencies; and a second frequency controller which, if the second match determination, unit determines that the frequency of the second recovered clock signal matches each of the plurality of frequencies, performs a control to determine the frequency of the second recovered clock signal recovered in the second clock recovering unit as the matching frequency, and the frequency of the second recovered clock signal recovered in the second clock recovering unit is switched between the plurality of frequencies until the frequency is determined by the second frequency controller.

* * * * *